United States Patent [19]

Martinez et al.

[11] Patent Number: 4,900,604

[45] Date of Patent: Feb. 13, 1990

[54] ADHESIVE WALL DECORATING SYSTEM

[75] Inventors: Angel R. Martinez; Frances M. Martinez, both of Calabasas, Calif.

[73] Assignee: Decorate-It!, Inc., Woodland Hills, Calif.

[21] Appl. No.: 289,628

[22] Filed: Dec. 22, 1988

[51] Int. Cl.[4] ........................ B32B 31/20; E04F 13/00

[52] U.S. Cl. .......................................... 428/79; 40/594; 156/63; 428/39; 428/187; 428/904.4

[58] Field of Search ...................... 428/39, 40, 79, 487, 428/904.4; 40/594; 156/63

[56] References Cited

U.S. PATENT DOCUMENTS

| | | | |
|---|---|---|---|
| 1,153,424 | 9/1915 | Doolittle et al. | 428/39 X |
| 1,475,922 | 11/1923 | Soglow | 428/48 |
| 1,648,020 | 11/1927 | Labram | 428/39 |
| 3,620,366 | 11/1971 | Parkinson et al. | 428/904.4 X |
| 3,629,034 | 12/1971 | Kuroda | 428/79 X |
| 3,914,891 | 10/1975 | Brewer | 40/594 |
| 4,015,352 | 4/1977 | Prange | 428/41 X |
| 4,264,666 | 4/1981 | Hix | 428/187 |
| 4,536,423 | 8/1985 | Travis | 40/594 X |

*Primary Examiner*—Henry F. Epstein
*Attorney, Agent, or Firm*—Kelly, Bauersfeld & Lowry

[57] ABSTRACT

A versatile wall decorating system is provided with self-adherent, pre-cut decorative appliques that removably attach onto substrate sheets adhered to walls. Both the appliques and the substrate sheets utilize a reusable, non-permanent adhesive coating. Such a coating permits rearrangement of the appliques on the substrate sheets and rearrangement of the substrate sheets on the walls, in a peel-off/press-on manner. Each applique provides decorative imagery of a common theme. Additionally, the substrate sheets may include decorative imagery which cooperates with the appliques to create a decorative wall scene. The appliques can also be adhered to surfaces other than the substrate sheets. The decorative scene presented by the wall decorating system is easily changed by repositioning the appliques or by removing appliques of one theme and substituting therefor appliques of a new theme.

17 Claims, 2 Drawing Sheets

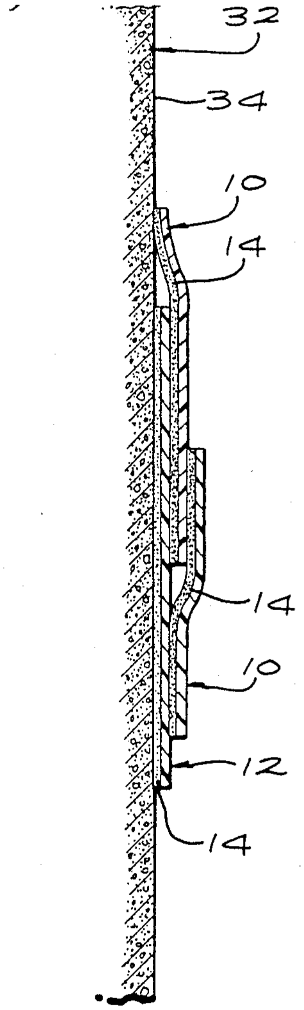
FIG. 3
FIG. 4
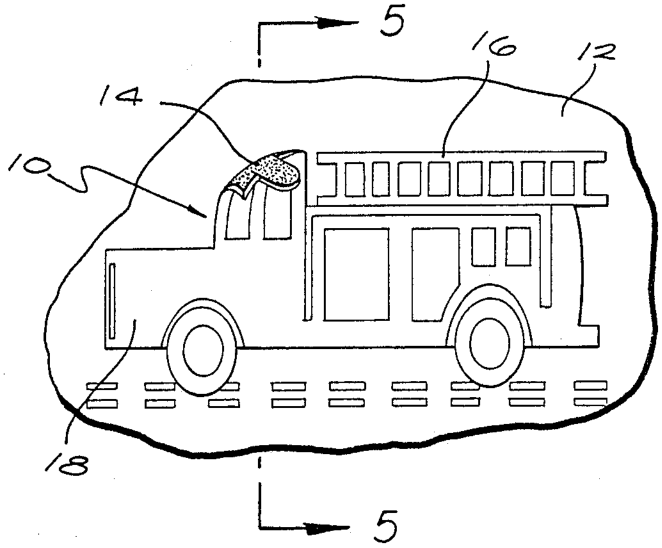
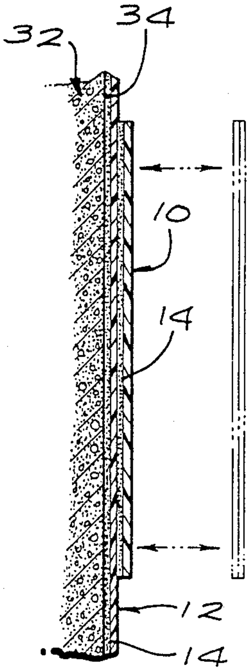
FIG. 5
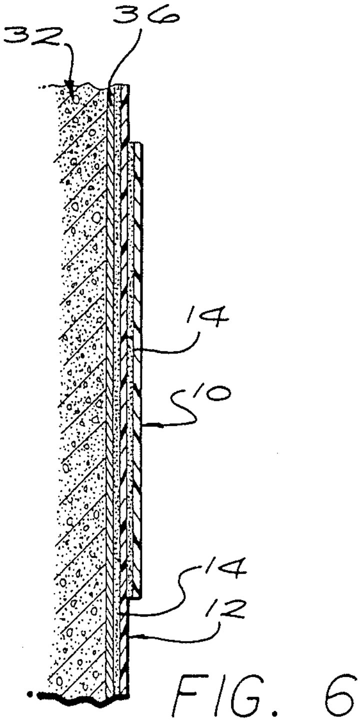
FIG. 6

ADHESIVE WALL DECORATING SYSTEM

BACKGROUND OF THE INVENTION

This invention relates generally to a versatile wall decorating system. More particularly, this invention relates to a wall decorating system having self-adherent appliques which press onto a background pattern to create a flexible, decorative wall scene that is easily changed by repositioning the appliques on the background pattern in a peel-off/press-on manner.

In general, walls are predominantly decorated with paint and/or wallpaper, each of which has several drawbacks. Paint is not reusable and is messy to apply. Wallpaper is relatively expensive and is difficult to install. Moreover, the permanent nature of wallpaper and paint precludes the creation of a flexible wall decoration which can be easily and quickly changed to a new configuration.

As alternatives to decorating walls with paint and/or wallpaper only, a variety of prior wall decorating systems have been developed. An example of these systems can be found in U.S. Pat. No. 1,475,922, entitled "Art of Decorating Walls." Generally speaking, the primary drawback of most prior decorating systems is that they provide a relatively permanent wall decoration which cannot be easily rearranged into a different decorative configuration after installation. This disadvantage is common in decorating systems which utilize permanent adhesives to secure the decorative elements onto the wall.

Some prior decorating systems utilize a plurality of pins, tacks, etc., to affix decorations onto a wall in a non-permanent fashion. However, although such systems may allow for subsequent rearrangement of a decorative scene, the use of tacks or the like, permanently mars the wall surface. Moreover, the use of sharp pins, tacks, etc., in decorating a small child's room creates the potential safety hazard of the child swallowing or stepping on a tack which has worked itself loose from the wall.

Yet another general type of prior decorating system involves appliques which are mounted onto a wall. These systems generally fail to provide a flexible decorative display which can be easily rearranged because the appliques are glued permanently in place. A further drawback often found in such systems is that installation time is increased because the appliques must be cut out prior to use.

There exists, therefore, a significant need for a versatile wall decorating system that is easily rearrangeable into different decorative configurations after installation. Additionally, an improved wall decorating system is needed which doesn't permanently mar walls or damage painted surfaces, and which is easily and quickly installed. Moreover, such an improved wall decorating system should be suitable for use in a small child's room so that the changeable decorative scene will stimulate the youngster's creativity by enabling the child to continually create new decorative arrangements. The present invention fulfills these needs in a relatively inexpensive fashion, and provides further related advantages.

SUMMARY OF THE INVENTION

The present invention resides in a novel adhesive wall decorating system that provides a versatile decorative wall scene which can be easily rearranged after its initial installation. The wall decorating system generally comprises a plurality of decorative pre-cut appliques having a reusable, non-permanent adhesive that bonds the appliques to a substrate sheet or other underlying surface in a manner permitting subsequent detachment and repositioning of the appliques.

The wall decorating system of the present invention is easily installed without marring walls or damaging painted surfaces. A decorative wall scene created using the present invention is easily changed because the decorative appliques on the substrate sheet can be repositioned or removed altogether in a quick and efficient manner. The wall decorating system is ideal for decorating a small child's room because it is installed without potentially hazardous pins, tacks, etc. Moreover, the dynamic nature of the wall decorating system allows a child to arrange decorative scenes in a variety of ways, thereby stimulating the youngster's creativity by providing an outlet for the expression of the child's imagination.

The beneficial versatility of the wall decorating system is evidenced by the fact that an entirely different decorative theme can be efficiently presented on the substrate sheet by merely peeling off appliques relating to one theme, and pressing on appliques of a different theme. This feature advantageously allows, for example, the provision of a seasonable decorating system which can be updated to always present a timely display of appliques with themes relating to the corresponding season. In addition, the present invention is relatively inexpensive and utilizes pre-cut appliques to minimize installation time.

In accordance with a preferred form of the invention, the wall decorating system utilizes a plurality of self-adherent appliques each of which comprises a relatively thin piece of flexible material having a brightly colored design printed on one side and a reusable adhesive coating on the opposite side. Each applique is pre-cut to a shape corresponding to its design. All appliques in a set share a common theme so that they cooperatively depict a thematic decorative wall scene once installed.

Borders of the wall scene are provided by vinyl substrate sheets which are pressed onto a wall. The substrate sheets include a reusable, non-permanent adhesive coating on one side, and can be installed end-to-end to form a continuous border on all walls of a room. Preferably, the substrate sheets present a decorative background pattern which is complementary with the theme of the appliques. For example, the background pattern might display railroad tracks for use with appliques designed as locomotives and railroad cars.

The appliques are pressed onto the substrate sheets to form a decorative wall scene. The reusable adhesive allows each applique to be easily peeled away from the substrate sheet and repositioned thereon so that the decorative scene can be easily reconfigured. Various thematic decorative scenes can be presented by merely substituting one thematic set of appliques for another. In addition, the appliques can be adhered to surfaces other than the substrate sheets, thus providing even greater flexibility in the decorative arrangement which can be displayed.

When pressed onto the background pattern of a substrate sheet or border, the appliques' decorative imagery constitutes the foreground features of the decorative scene. In this respect, several appliques can be adjacently positioned or overlapped to cooperatively define a single foreground feature. For example, a car can be represented by combining an applique showing a tire with an applique showing an automobile body. The creation of detailed scenic features by combining several appliques depicting various components of a feature, expands the versatility of the wall decorating system because scenic features can be modified by varying some of their constituent appliques.

Other features and advantages of the present invention will become apparent from the following more detailed description when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3 is an enlarged cross-sectional view taken generally on line 3—3 of FIG. 1, illustrating a first applique in overlapping relation with a wall, and a second applique which overlaps the first and the substrate sheet;

FIG. 4 is an enlarged front elevational view of the applique and the substrate sheet portion contained within circle 4 of FIG. 2, illustrating the flexible, peel-off nature of the applique;

FIG. 5 is a cross-sectional view taken generally on line 5—5 of FIG. 4, illustrating adherence of the substrate sheet to a painted wall; and FIG. 6 is a cross-sectional view similar to FIG. 5, illustrating adherence of the substrate sheet to a wallpapered wall.

DETAILED DESCRIPTION OF THE PREFERRED EMBODIMENT

Figure 1:
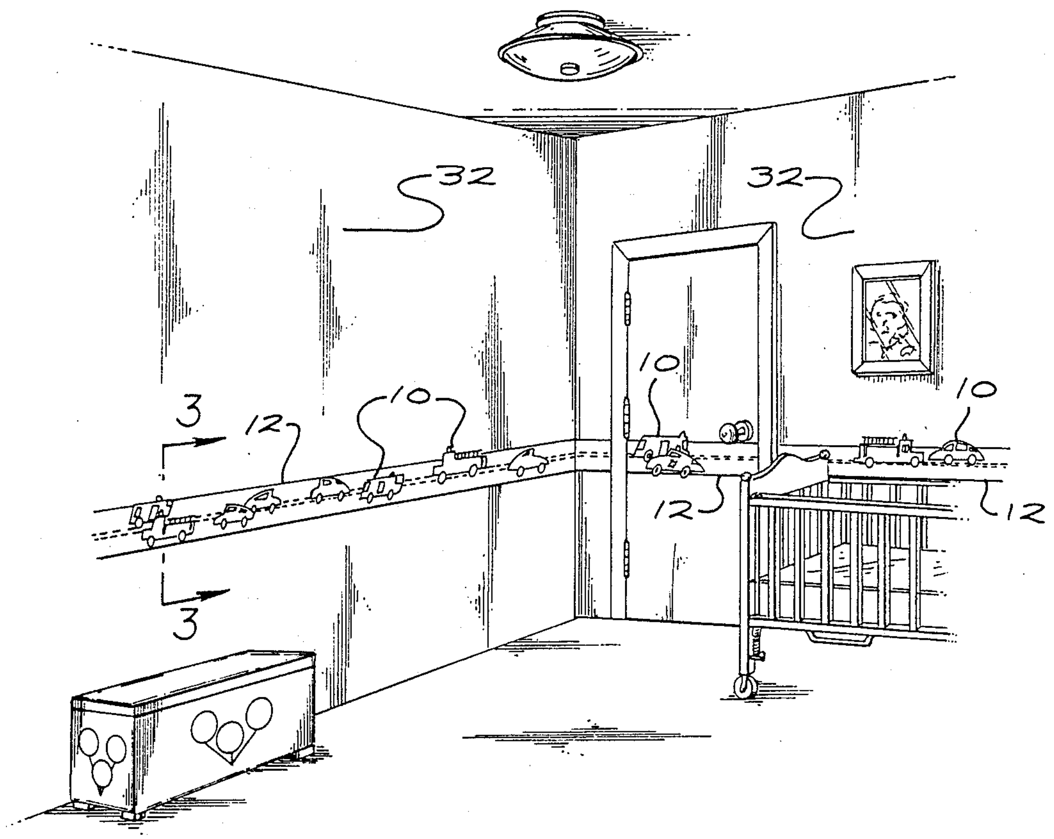
FIG. 1 is a perspective environmental view of an adhesive wall decorating system embodying the invention, shown as applied on two walls and a door in a child's bedroom.

As shown in the exemplary drawings, the present invention resides in a versatile adhesive wall decorating system having a plurality of self-adherent appliques 10 which can be attached to one or more substrate sheets 12 of border material by a reusable, self-contained non-permanent adhesive that allows repositioning of the appliques in a peel-off/press-on manner after installation. As shown in FIG. 1, the appliques 10 provide complementary decorative images which cooperate with one another and with the substrate sheets 12 to create a thematic decorative scene that can be easily rearranged.

The present invention provides a relatively inexpensive alternative to decorating solely with paint and/or wallpaper, both of which are relatively permanent once applied. In contrast, the adhesive wall decorating system remains removable or rearrangeable once in place. Furthermore, the adhesive wall decorating system is not as messy or difficult to apply as paint and wallpaper. The wall decorating system's use of non-drying adhesive beneficially ensures that the system can be installed quickly and efficiently without marring walls or damaging painted surfaces. Moreover, the usage of a non-permanent adhesive allows decorative components of the system to be removably attached to an underlying surface without requiring pins, tacks, etc. The present invention's omission of such sharp attachment means ensures that the wall decorating system can be safely rearranged by small children. This advantageously makes the wall decorating system ideal for use in a youngster's room where it will spark the child's creative development by enabling the child to express his or her imagination by rearranging the decorative appliques into various decorative scenes.

The easily changeable nature of the invention beneficially allows different appliques to be used as a child grows and changes interests. For example, the highway scene illustrated in FIGS. 1 and 2 can be replaced by sports related appliques so that the wall decorating system retains its appeal over the years. The wall decorating system can also be updated throughout the year by utilizing appliques relating to holidays or to the four seasons.

Figure 2:
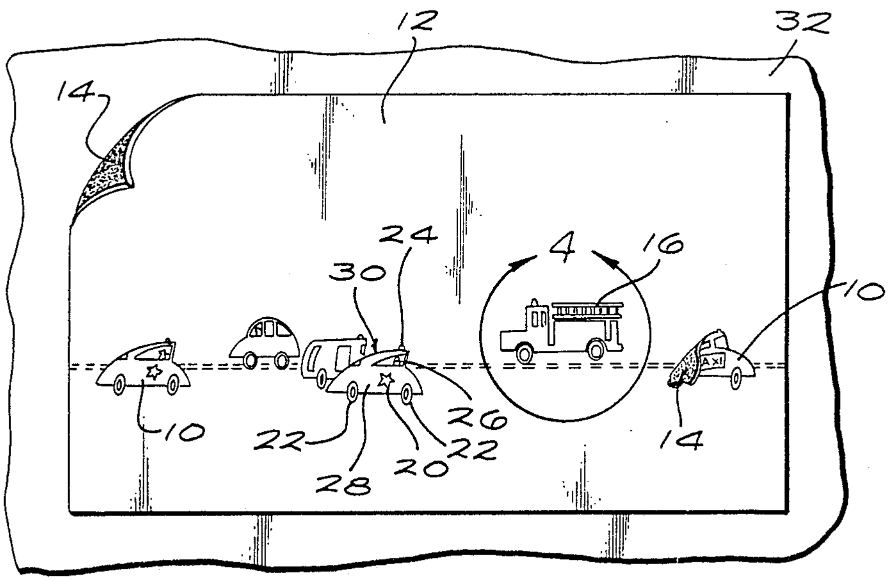
FIG. 2 is an enlarged, elevational view of one substrate sheet applied to a painted wall similar to the substrate, border-forming sheets shown in FIG. 1, illustrating the flexible peel-off nature of the substrate sheet and the variable nature of the size of the substrate sheets and the positioning of appliques thereon.

In accordance with the present invention, the appliques 10 comprise relatively thin pieces of vinyl or other flexible material having a reusable non-permanent adhesive coating 14 on one side (FIGS. 2 and 4). A decorative image is presented by an applique 10 because it is pre-cut from bright, eye-catching material into the shape of one or more scenic features such as trees, cars, personages, etc. The fact that the appliques are pre-cut also facilitates installation.

The decorative nature of an applique 10 can be enhanced by overlapping additional appliques thereon to provide details of the scenic feature to be depicted. For example, the ladder 16 in FIG. 4 can be an additional applique which is attached onto a larger applique 18 representing a fire truck. Details can also be pre-printed onto the appliques 10.

The versatility of the wall decorating system is greatly enhanced because appliques are provided for representing components or details of larger scenic features. A composite scenic feature is then created by positioning constituent component appliques 10 in adjacent or overlapping positions. For example, in FIG. 2, a star 20, two tires 22, a siren 24 and a driver 26 can all be component appliques that combine with an auto body applique 28 to cooperatively define a police car 30. These appliques can advantageously be interchanged with other component appliques, thereby increasing the variety of decorative features which can be depicted using the present invention. The opportunity to build a detailed, decorative image using a plurality of complementary appliques provides an appealing, mess-free creative outlet for a young child.

The self-adherent appliques 10 conveniently press onto the substrate sheets 12 to create a decorative wall scene, such as that shown in FIG. 1. The decorative scene can subsequently be changed by peeling off the appliques and repositioning them on the substrate sheets 12. As illustrated in FIG. 3, the flexible nature of the appliques 10 allows them to be placed in overlapping relation with the substrate sheet 12 as well as a wall 32 and/or an adjacent applique 10. The appliques 10 can be adhered to other surfaces of a room so that the versatile wall decorating system is not limited to applique placement on the substrate sheets 12.

The substrate sheets 12 form a vinyl border which provides a background for a basic theme. Each substrate sheet 12 has a reusable, self-contained non-permanent adhesive coating 14 (FIG.2) on one side. The adhesive coating 14 allows the substrate sheet to be easily and quickly pressed on and peeled off of the wall 32 without marring the wall surface. The adhesive coating 14 permits the substrate sheet 12 to effectively cling to an underlying layer of paint 34 (FIG. 5) or wallpaper 36 (FIG. 6) in a detachable, non-damaging manner.

Preferably, a plurality of the substrate sheets 12 are used in decorating a room. These substrate sheets 12 can be placed end-to-end to form a continuous border on all walls 32 of a room, as illustrated in FIG. 1. To achieve a continuous border, adjacent substrate sheets 12 are abutted in corners of the room. The substrate sheets 12 are preferably installed about three to five feet above floor level. When the wall decorating system is used in a small child's room, the substrate sheets 12 should be affixed onto the walls 32 at a height enabling the child to reach and rearrange the decorative scene displayed thereon by the appliques 10.

The substrate sheets 12 include decorative imagery on the side opposite the adhesive coating 14. Preferably, the decorative imagery provides a background pattern having a theme which complements a set of thematic appliques included with the wall decorating system. The background pattern and the appliques cooperatively define a decorative wall scene. The background pattern can show, for example, roads, railroad tracks, beach scenery, moon craters, etc. Alternatively, the substrate sheets 12 can be a solid color devoid of decorative imagery, in which case the imagery of the decorative wall scene is provided solely by the appliques 10.

Complementary applique sets and substrate sheets are provided with themes that are age and gender oriented for use in children's rooms. Exemplary themes include sports, space, dinosaurs, and transportation. The wall decorating system provides an effective way to decorate other rooms of a house as well by utilizing thematic appliques relating to, for example, various holidays or to the four seasons.

From the foregoing, it will be appreciated that the versatile wall decorating system of the present invention provides an easy-to-install, decorative wall scene of a flexible nature, with decorative imagery that is removable and rearrangeable in a manner permitting one to vary the configuration of the decorative scene. The adjustability of the decorative scene advantageously stimulates a child's creativity by providing an outlet for the expression of the youngster's imagination. Moreover, the present invention provides a relatively inexpensive way to decorate a room without marring walls or damaging painted surfaces. Further, the use of sets of interchangeable thematic appliques 10 allows the decorative scene to be continually updated according to, for example, the time of the year or the age of the child. Finally, the quick, efficient manner of installing the pre-cut appliques and the substrate sheets 12, economically permits an entire room to be beautifully decorated in less than an hour.

While a particular form of the invention has been illustrated and described, it will be apparent that various modifications may be made without departing from the spirit and scope of the invention. Accordingly, it is not intended that the invention be limited, except as by the appended claims.

We claim:

1. A wall decorating system, comprising:

at least one substrate sheet including a first side positioned adjacent to a wall, and a second side having either a decorative pattern or solid colored imagery;

means for attaching the first side of the at least one substrate sheet onto the wall in a reusable, non-permanent press-on/peel-off manner; and a plurality of pre-cut, self-adherent appliques, each having a reusable, non-permanent adhesive on a first side and decorative imagery on a second side, wherein the adhesive adheres the applique onto the second side of the at least one substrate sheet in a reusable non-permanent, press-on manner which permits detachment of the applique therefrom, and wherein the imagery on the appliques and the pattern or imagery on the at least one substrate sheet cooperate to create a decorative scene which can be rearranged by peeling off the appliques from the at least one substrate sheet and repositioning the appliques thereon.

2. A wall decorating system as set forth in claim 1, wherein the at least one substrate sheet provides horizontal and vertical borders for the wall decorating system.

3. A wall decorating system as set forth in claim 1, wherein the at least one substrate sheet includes a plurality of substrate sheets, each of which abuts an adjacent sheet in an end-to-end manner.

4. A wall decorating system as set forth in claim 3, wherein the substrate sheets create a decorative border on more than one wall.

5. A wall decorating system as set forth in claim 3, wherein the decorative pattern provides a background and the decorative imagery depicts foreground features having a theme which is complementary with the background, whereby a thermatic decorative wall scene is created, the thematic scene being changeable by repositioning the appliques on the substrate sheets.

6. A wall decorating system as set forth in claim 5, wherein a plurality of the appliques positioned adjacently on a substrate sheet cooperatively depict a single foreground feature.

7. A method of decorating a wall, the steps comprising:

providing at least one substrate sheet including a first side having a self-contained adhesive and a second side having a decorative pattern thereon;

providing more than one pre-cut; self-adherent appliques having a reusable, self-contained non-permanent adhesive on a first side thereof, and decorative imagery on a second side thereof;

mounting the first side of the at least one substrate sheet onto a wall;

pressing the appliques onto the at least one substrate sheet, the appliques adhering to the at least one substrate sheet in a non-permanent manner to permit detachment of the appliques from the at least one substrate sheet;

peeling off the appliques from the at least one substrate sheet; and repositioning the appliques upon the at least one substrate sheet by re-pressing the appliques thereon.

8. A wall decorating method as set forth in claim 7, including the step of arranging the appliques on the second side of the at least one substrate sheet wherein the pattern of the at least one substrate sheet and the imagery on the appliques cooperate to create a decorative wall scene.

9. A wall decorating method as set forth in claim 8, further including the step of overlapping portions of at least two appliques during pressing of the appliques onto the at least one substrate sheet.

10. A wall decorating method as set forth in claim 7, wherein the step of mounting the at least one substrate sheet comprises gluing the at least one substrate sheet using a reusable, non-permanent adhesive.

11. A wall decorating method as set forth in claim 7, including the steps of providing a plurality of substrate sheets and mounting the substrate sheets wherein each substrate sheet abuts an adjacent sheet in an end-to-end manner.

12. A wall decorating method as set forth in claim 11, including the step of mounting the substrate sheets on adjacent walls such that the substrate sheets abut in at least one corner of a room to form a continuous decorative pattern.

13. A wall decorating method as set forth in claim 8, including the steps of detaching first appliques from the at least one substrate sheet and pressing second appliques onto the at least one substrate sheet, wherein the first appliques include decorative imagery corresponding to a first theme and the second appliques include decorative imagery corresponding to a second theme.

14. A wall decorating system, comprising:

a plurality of substrate sheets, each having a reusable, self-contained non-permanent adhesive on a first side and a decorative pattern on a second side, wherein the first sides of the substrate sheets are fixed upon more than one wall in a non-permanent, press-on manner which permits detachment of the substrate sheets from the walls such that each substrate sheet abuts an adjacent sheet in an end-to-end manner to create a decorative border; and a plurality of pre-cut, self-adherent appliques, each having a reusable, self-contained non-permanent adhesive on a first side and decorative imagery on a second side, wherein the first sides of the appliques are fixed to the decorative border in a non-permanent, press-on manner which permits detachment of the appliques from the substrate sheets such that the imagery on the appliques and the pattern on the substrate sheets cooperate to create a decorative scene which can be rearranged by peeling off the appliques from the substrate sheets and repositioning the appliques thereon.

15. A wall decorating system as set forth in claim 14, wherein a plurality of appliques positioned on one or more substrate sheet cooperatively depict a single decorative image.

16. A wall decorating system as set forth in claim 15, wherein at least one of the plurality of appliques is at least partially positioned over and attached to a wall.

17. A wall decorating system as set forth in claim 15, including an additional substrate sheet having a reusable, self-contained non-permanent adhesive on a first side and a decorative pattern on a second side, wherein the first side of the additional substrate sheet at least partially overlies at least one of the plurality of substrate sheets.

* * * * *

UNITED STATES PATENT AND TRADEMARK OFFICE

CERTIFICATE OF CORRECTION

PATENT NO. : 4,900,604

DATED : February 13, 1990

INVENTOR(S) : Angel R. Martinez and Frances M. Martinez

It is certified that error appears in the above-identified patent and that said Letters Patent is hereby corrected as shown below:

In column 6, line 32, delete the word "thermatic" and insert therefor --thematic--.

In column 6, line 66, delete the word "further".

Signed and Sealed this

Fifteenth Day of January, 1991

*Attest:*

HARRY F. MANBECK, JR.

*Attesting Officer*

*Commissioner of Patents and Trademarks*